(12) United States Patent
Funakoshi et al.

(10) Patent No.: US 6,359,705 B2
(45) Date of Patent: *Mar. 19, 2002

(54) IMAGE READING APPARATUS

(75) Inventors: Masahiro Funakoshi; Daisuke Suga, both of Toride (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/999,131

(22) Filed: Dec. 29, 1997

(30) Foreign Application Priority Data

Dec. 26, 1996 (JP) .............................. 8-356946
May 15, 1997 (JP) .............................. 9-139106

(51) Int. Cl.⁷ ................................................ H04N 1/04
(52) U.S. Cl. ........................ 358/475; 358/496; 358/497
(58) Field of Search ............................. 358/475, 495, 358/496, 497, 296, 498; 355/25, 83, 51, 67, 69

(56) References Cited

U.S. PATENT DOCUMENTS

| | | | | |
|---|---|---|---|---|
| 4,291,974 A | * | 9/1981 | Silveberg | 355/76 |
| 4,598,323 A | * | 7/1986 | Honjo et al. | 358/496 |
| 4,739,376 A | * | 4/1988 | Kanekol | 355/75 |
| 4,899,192 A | * | 2/1990 | Fujita | 355/51 |
| 4,933,722 A | * | 6/1990 | Fujiwara | 355/233 |
| 5,216,526 A | * | 6/1993 | Ju | 358/498 |
| 5,410,347 A | * | 4/1995 | Steinle et al. | 348/270 |
| 5,448,340 A | * | 9/1995 | Ogiri et al. | 358/496 |
| 5,608,547 A | * | 3/1997 | Nakatani et al. | 358/505 |
| 5,966,221 A | * | 10/1999 | Tellam et al. | 358/475 |

\* cited by examiner

*Primary Examiner*—Madeleine Nguyen
(74) *Attorney, Agent, or Firm*—Fitzpatrick, Cella, Harper & Scinto

(57) ABSTRACT

The present invention provides an image reading apparatus comprising a transparent plate, a convey means for conveying an original onto the transparent plate, a light source for illuminating the original, a light receiving element for reading an image of the original illuminated by the light source through the transparent plate, the light receiving element being shifted in a first mode in which the original stopped on the transparent plate is read and being kept stationary in a second mode in which the original being shifted by the convey means is read, and a control means for controlling a light amount of the light source in accordance with the first mode or the second mode.

10 Claims, 14 Drawing Sheets

FIG. 15

| LUMINANCE VALUE | DENSITY VALUE FOR READING ADF | DENSITY VALUE FOR READING FROM ON STAGE FOR ORIGINAL |
|---|---|---|
| 0 | 63 | 63 |
| 1 | 63 | 24 |
| 2 | 24 | 22 |
| 3 | 22 | 20 |
| 4 | 20 | 19 |
| 5 | 19 | 18 |
| 6 | 18 | 17 |
| 7 | 17 | 17 |
| 8 | 17 | 16 |
| . | . | . |
| . | . | . |
| 55 | 3 | 2 |
| 56 | 2 | 2 |
| 57 | 2 | 2 |
| 58 | 2 | 2 |
| 59 | 2 | 0 |
| 60 | 0 | 0 |
| 61 | 0 | 0 |
| 62 | 0 | 0 |
| 63 | 0 | 0 |

IMAGE READING APPARATUS

BACKGROUND OF THE INVENTION

1. Field of the Invention

The present invention relates to an image reading apparatus for reading image information on an object to be read by a scanning operation, and more particularly, it relates to an image reading apparatus having different scanning systems in which, when the object to be read is a book having a substantial thickness, the object is read while shifting an image reading unit, and, when the object to be read is a thin sheet, the object is read while shifting the object and which is applicable to a facsimile system or a copying machine.

2. Related Background Art

Among conventional reading apparatuses in which an image sensor of close contact type consisting of combination of a light emitting element array and a light receiving element array is used as an image reading device, there is an image reading apparatus having a function for reading two-dimensional image information from a thick object to be read such as a book and a function for reading two-dimensional information continuously from a plurality of fixed-shape sheets to be read.

Briefly explaining, when a thick original such as a book is read (first mode), the original is rested on a transparent plate and an image on the original is read while shifting a reading device.

On the other hand, when a sheet-shaped original is read (second mode), the original is rested on a tray, and an image on the original is read while automatically conveying the original onto a transparent plate by means of convey rollers. In this case, the reading device is stopped at a predetermined position in order to read the image on the shifting original.

However, in the second mode, since the sheet-shaped original conveyed while applying a slight tension force to the original along a conveying direction to prevent the slack of the sheet-shaped original at a reading position, the reading is effected in a condition that the sheet-shaped original is not completely contacted with the glass plate. To the contrary, in the first mode, the original is closely contacted with the glass plate.

Accordingly, when a light emitting amount of the light emitting element is constant, illuminance on the original differs between the first mode and the second mode. If the illuminance differs, reading density will be varied even regarding the original having the same image density.

In a facsimile having an automatic original (document) feeder (ADF) and an original support plate, when the original is read from ADF, for example, as shown in FIG. 10, while the original is being read, diffused reflection light and/or stray light (shown by the arrows) from a light source 201 is incident on a light receiving element 203. On the other hand, when the original is read from the original support plate, for example, as shown in FIG. 11, since the original 206 is urged against the original support plate 501 by a pressure plate 502, the diffused reflection light and/or stray light is not incident on the light receiving element 203. Incidentally, in FIG. 11, the reference numeral 301 denotes an image sensor.

In the conventional facsimiles, when image data is accumulated in a memory, output is emitted with low resolving power; whereas, when the image data is not accumulated in the memory, output is emitted with high resolving power. However, in any cases where the image data is outputted with low resolving power and where the image data is outputted with high resolving power, the same luminance/density conversion table is used.

However, in the above-mentioned conventional techniques, when the original conveyed from the ADF is read, since the diffused reflection light and/or stray light is incident on the image sensor, a reading illuminance value becomes greater in comparison with a reading illuminance value when the original is read from the original support plate. Thus, there is a disadvantage that density of an output image is reduced.

Further, in the above-mentioned conventional techniques, when the output resolving power is changed, a recording dot width is also changed. Thus, since gradient of a recording apparatus is varied with the output resolving power, even when the same density value is outputted during the recording, density of images is varied.

SUMMARY OF THE INVENTION

The present invention aims to eliminate the above-mentioned conventional drawbacks, and an object of the present invention is to provide an image reading apparatus in which the reading can be effected with high accuracy.

Another object of the present invention is to provide an image reading apparatus in which difference in reading density between a first mode and a second mode is small.

A further object of the present invention is to provide an image reading apparatus comprising a transparent plate, a convey means for conveying an original onto the transparent plate, a light source for illuminating the original, a light receiving element for reading an image of the original illuminated by the light source through the transparent plate, the light receiving element is shifting in a first mode in which the original stopped on the transparent plate is read and being kept stationary in a second mode in which the original is being shifted by the convey means is read, and a control means for controlling a light amount of the light source in accordance with the first mode or the second mode of said light receiving.

A still further object of the present invention is to provide an image reading apparatus comprising a transparent plate, a convey means for conveying an original onto the transparent plate, a light source for illuminating the original, a light receiving element for reading an image of the original illuminated by the light source through the transparent plate, the light receiving element is being shifted in a first mode in which the original stopped on the transparent plate is read and being kept stationary in a second mode in which the original being shifted by the convey means is read, and a conversion means for determining image density in accordance with an output from the light receiving element, which conversion means includes a first conversion table for the first mode and a second conversion table for the second mode.

The other objects of the present invention will be apparent from the following detailed explanation of the invention.

BRIEF DESCRIPTION OF THE DRAWINGS

FIG. 15 is an explanatory view showing contents of an illuminance/density conversion table in the reading apparatus according to the second embodiment.

DETAILED DESCRIPTION OF PREFERRED EMBODIMENTS

The present invention will now be explained in connection with embodiments thereof with reference to the accompanying drawings. However, dimensions, materials, configurations and relative positional relations of constructural elements shown in the embodiments do not limit the present invention, so long as they are not specified.

Figure 1:
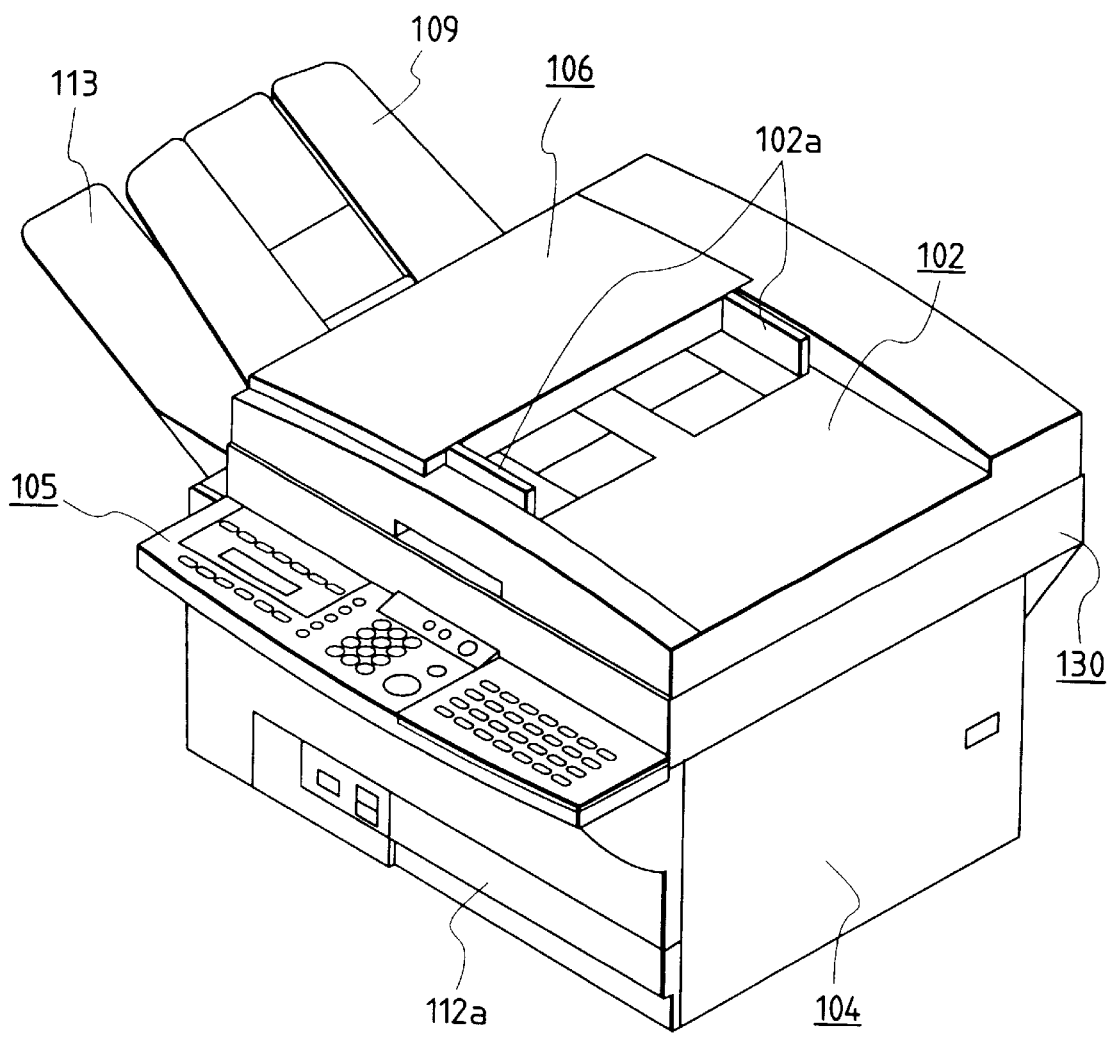
FIG. 1 is a perspective view of a facsimile apparatus according to a first embodiment of the present invention.
Figure 2:
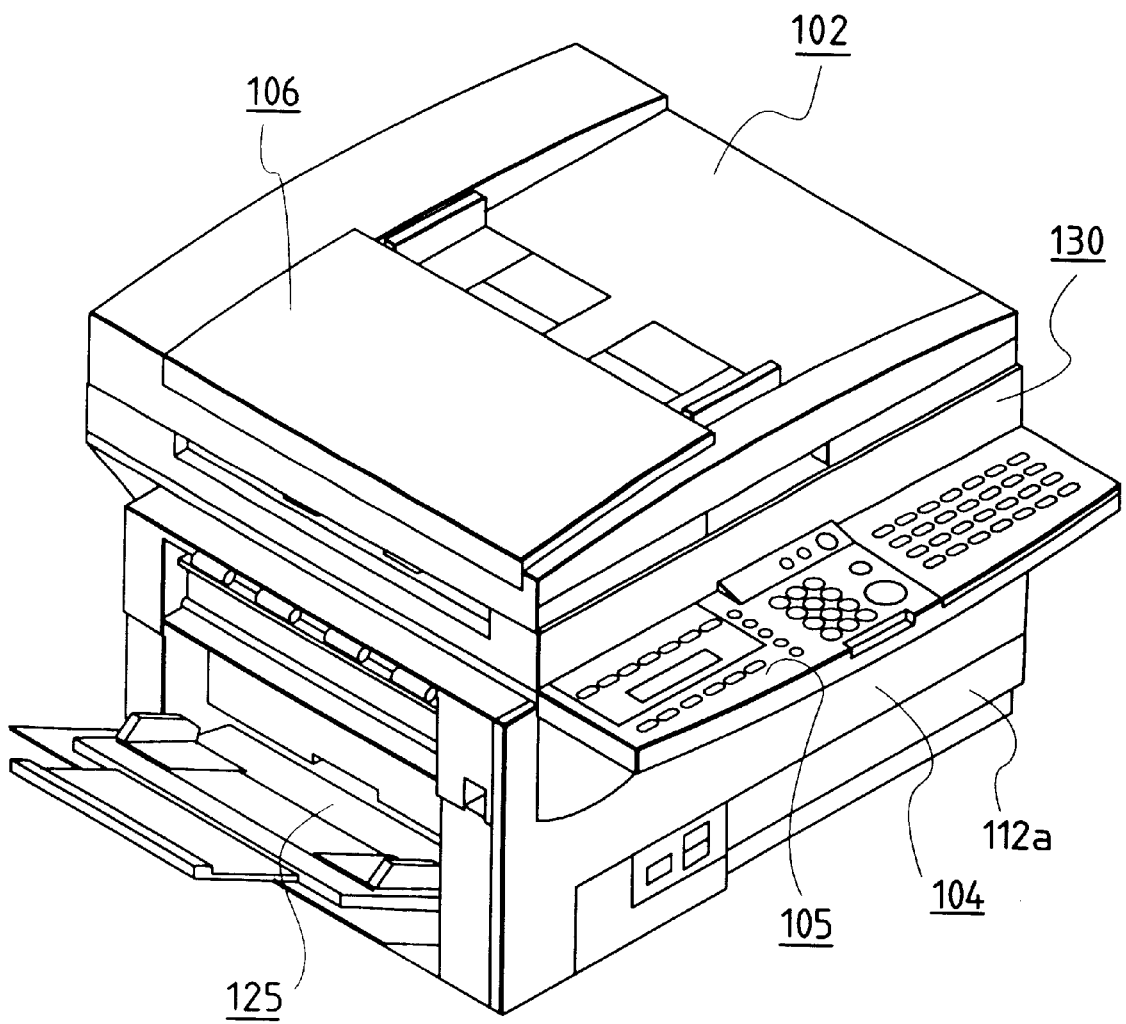
FIG. 2 is a perspective view showing the facsimile apparatus according to the first embodiment, with a discharge tray is omitted.
Figure 3:
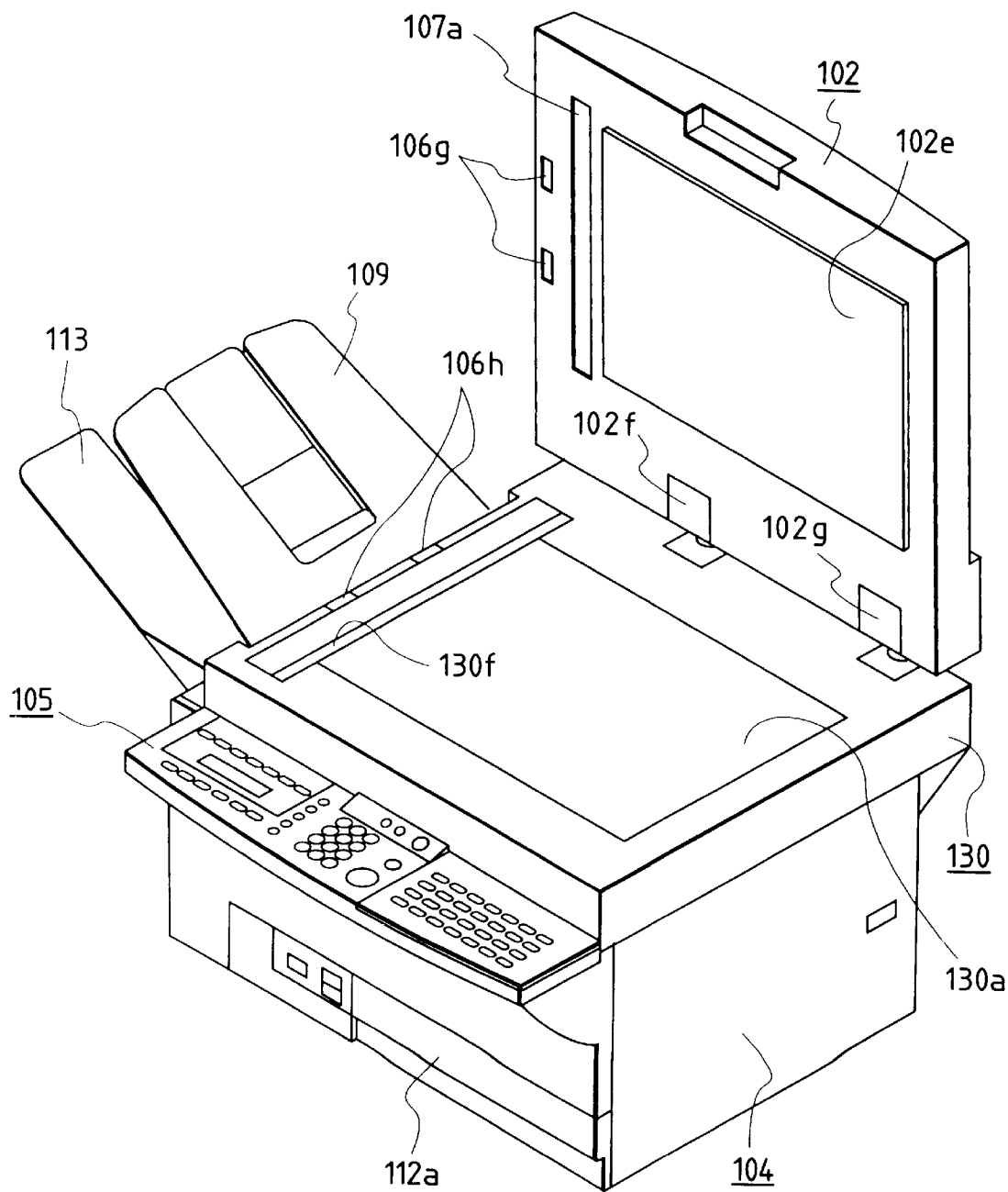
FIG. 3 is a perspective view of the facsimile apparatus according to the first embodiment in a condition that a pressure plate is opened.
Figure 4:
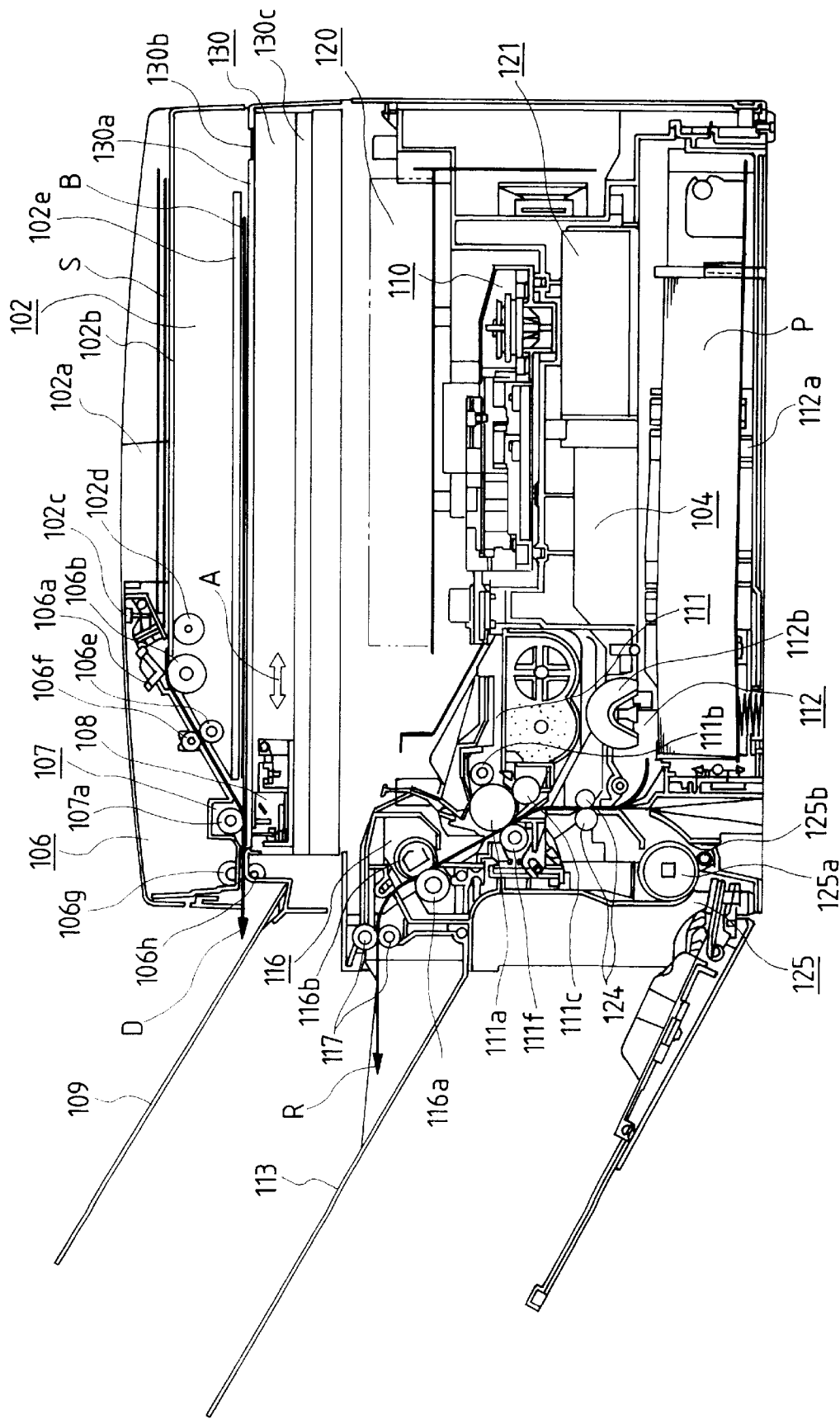
FIG. 4 is an elevational sectional view of the facsimile apparatus according to the first embodiment.
Figure 5:
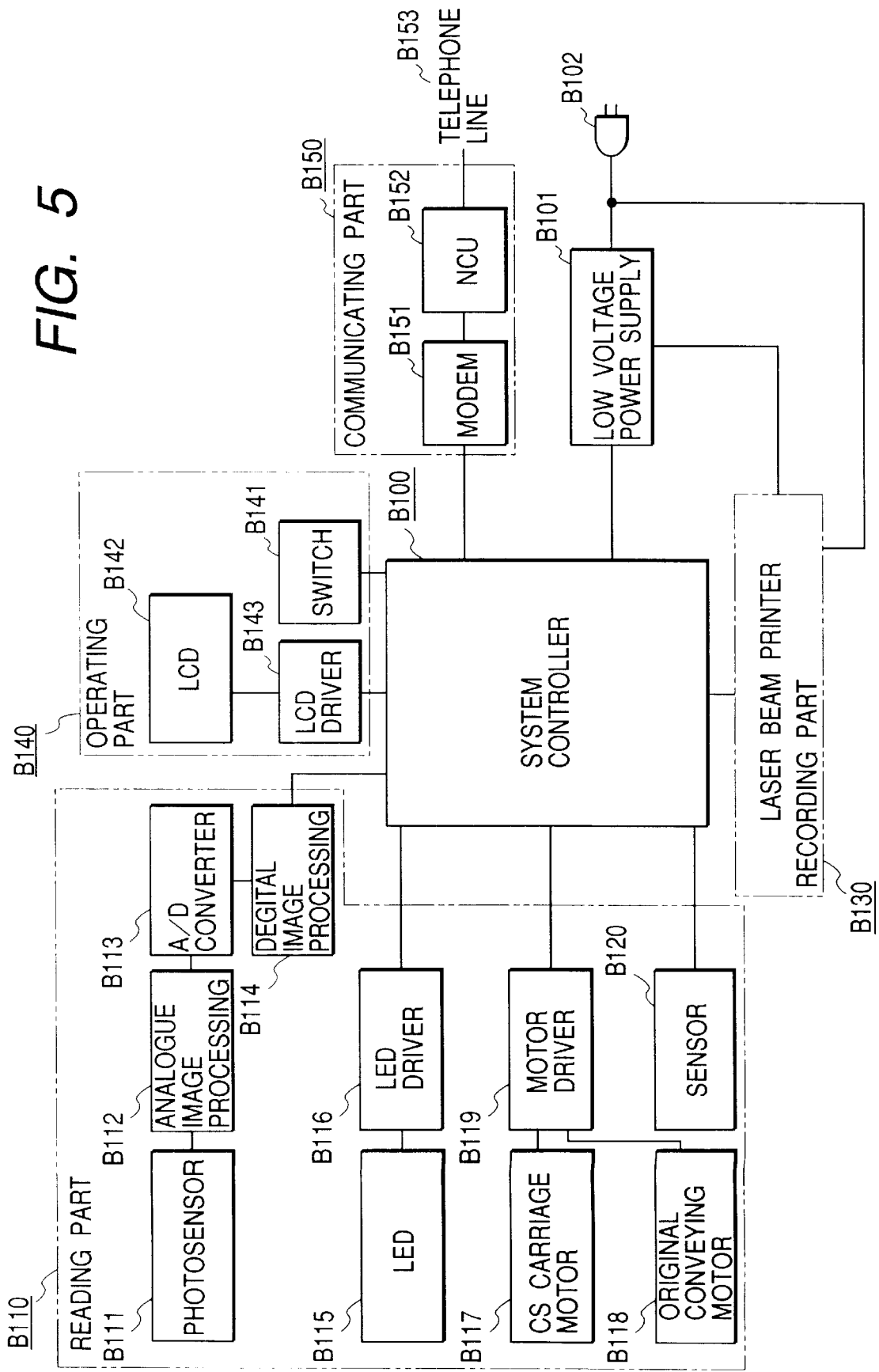
FIG. 5 is a block diagram of the facsimile apparatus according to the first embodiment.
Figure 6:
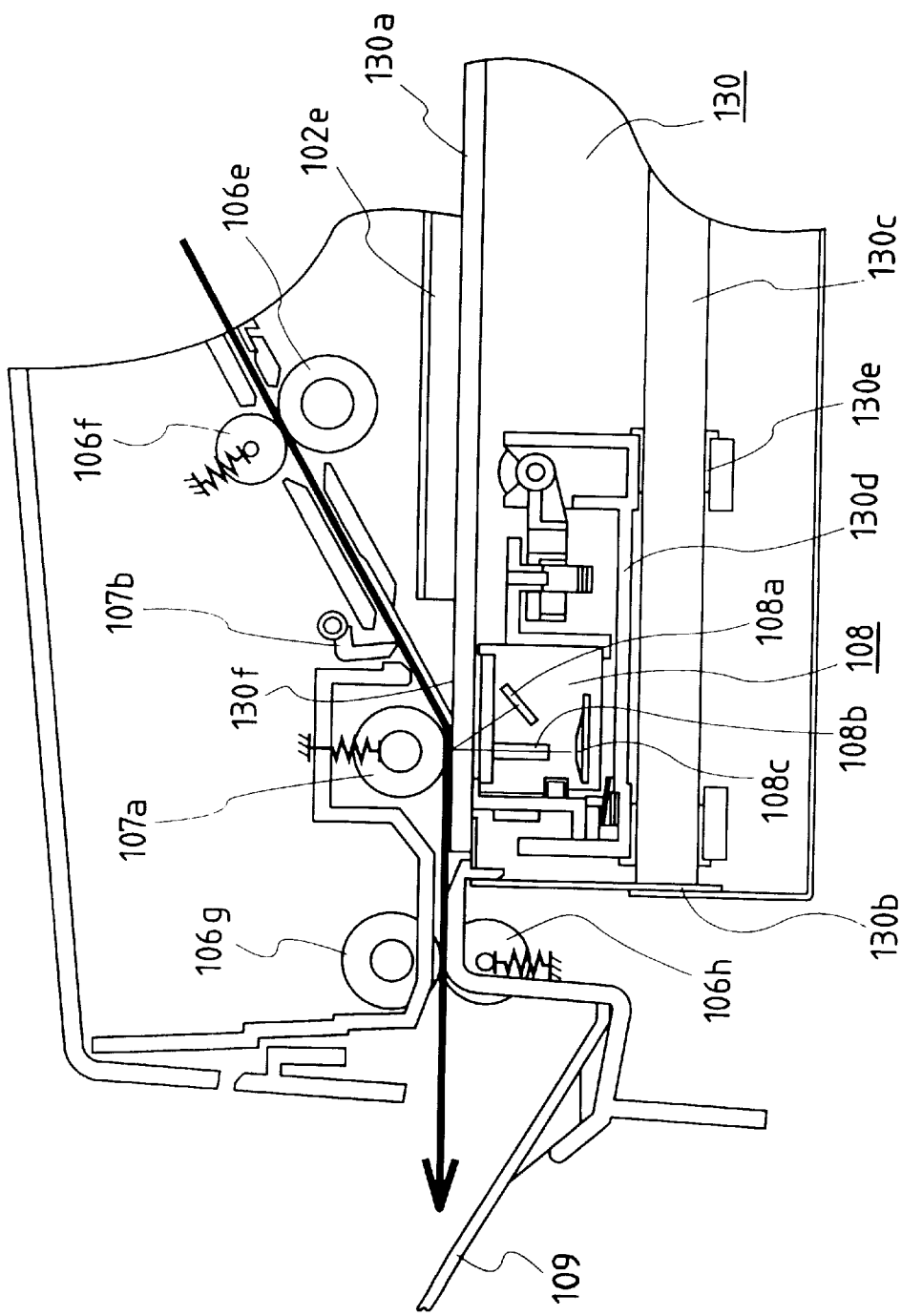
FIG. 6 is a sectional view of an image reading apparatus of the facsimile apparatus according to the first embodiment, along a sub scanning direction.
Figure 7:
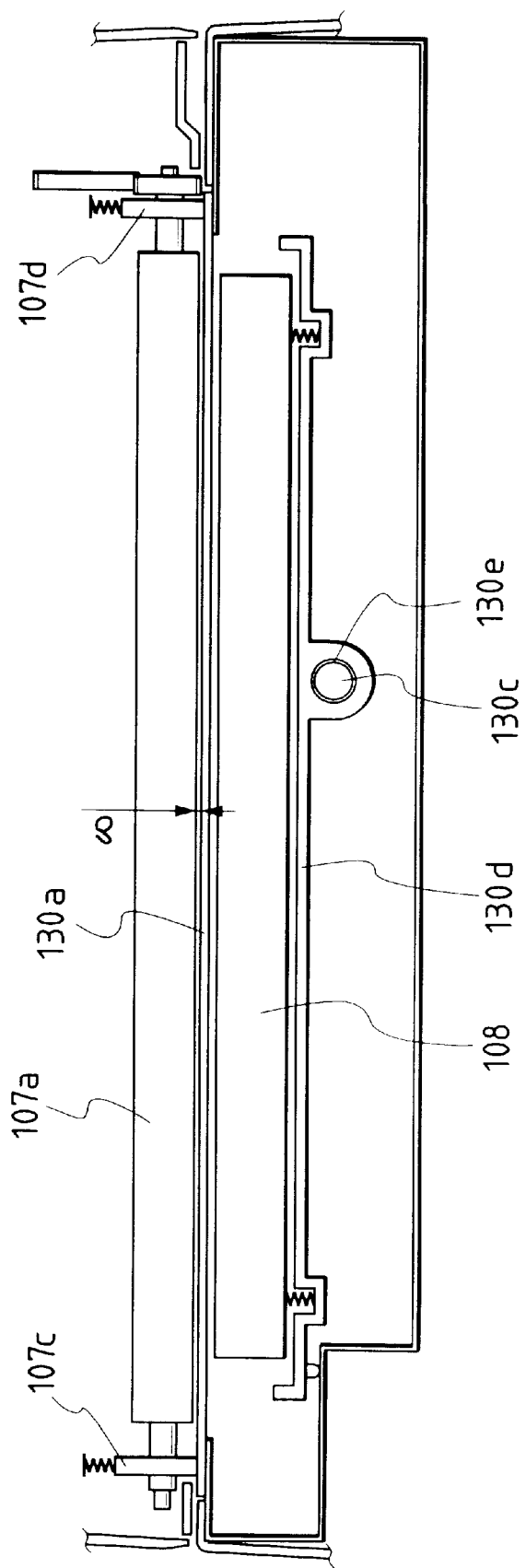
FIG. 7 is a sectional view of the image reading apparatus of the facsimile apparatus according to the first embodiment, along a main scanning direction.
Figure 8:
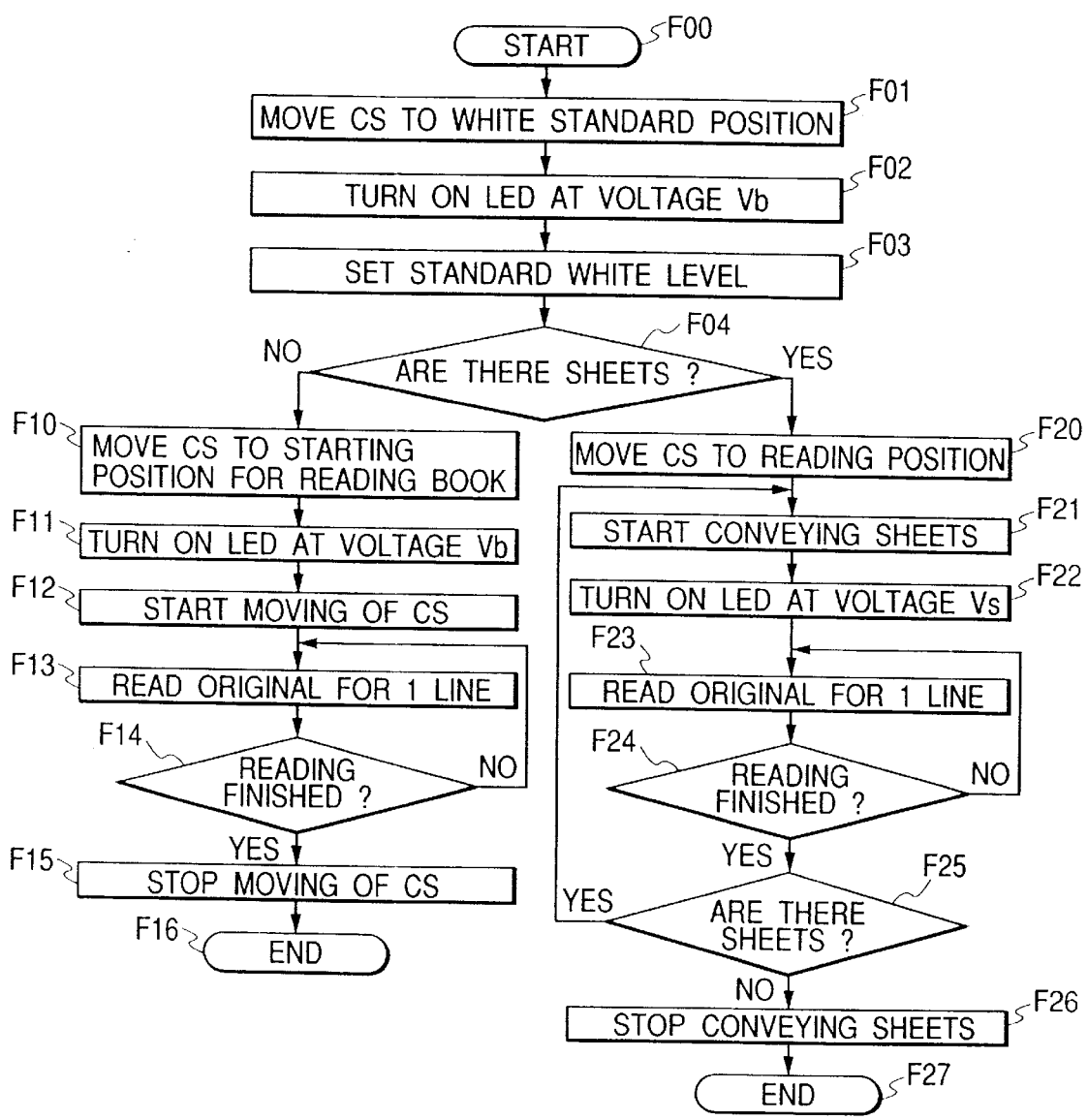
FIG. 8 is a flow chart showing a reading operation of the image reading apparatus of the facsimile apparatus according to the first embodiment.

FIGS. 1 to 3 are perspective view of a facsimile apparatus according to a first embodiment of the present invention, and FIG. 4 is a sectional view of the facsimile apparatus. FIG. 5 is a block diagram of the facsimile apparatus, FIG. 6 is a sectional view of an image reading portion of the facsimile apparatus, along a sub scanning direction, FIG. 7 is a sectional view of the image reading portion of the facsimile apparatus, along a main scanning direction, and FIG. 8 is a flow chart showing a reading operation of the facsimile apparatus.

[Brief Explanation of Entire Facsimile Apparatus]

In FIGS. 1, 2, 3 and 4, a flat head scanner 130 serves to read an image of an original (object to be read) B rested on an original support glass plate 130a. A pressure plate 102 can be opened and closed around fulcrums a, b. After the pressure plate 102 is opened, an original D is rested on the original support glass plate 130a, and the original D can be closely contacted with the original support glass plate 130a by closing the pressure plate. An image sensor 108 of close contact type serves as an image reading unit for reading the image.

An original stacking part 102b on which a plurality of originals S can be stacked is provided on an upper surface of the pressure plate 102. An original separation/convey part 106 is provided within the pressure plate 102 and serves to separate the originals S rested on the original stacking part 102b one by one and convey the separated original so that the image of the original can be read at a sheet reading part 107 while conveying the original. The original discharged from the facsimile apparatus is collected on an original discharge tray 109.

The reference numeral 104 denotes a laser beam printer constituting a recording part of electrophotographic type using a laser beam scanner 110; 111 denotes an image forming part for transferring an image onto a recording sheet; 112 denotes a cassette sheet supply part for supplying and conveying sheets one by one from a box-shaped sheet supply cassette (in which a plurality of sheets are stacked) toward the image forming part; 125 denotes a manual insertion sheet supply part for separating sheets (stacked on a recording sheet stacking tray) one by one toward the image forming part; 116 denotes a fixing part for fixing the image transferred to the recording sheet in the image forming part 111 onto the recording sheet; 117 denotes a pair of discharge rollers; and 113 denotes a recording sheet discharge tray on which the discharged recording sheets are stacked.

The reference numeral 105 denotes an operation part for effecting display and input; 120 denotes a control part for electrically controlling the entire apparatus (such as reading, communication, operation); and 121 an DC source for supplying DC electric power to parts of the apparatus.

In FIG. 5, the reference numeral B100 denotes a system controller for controlling an electric system of the entire facsimile apparatus; and B101 denotes a power supply for supplying electric power to parts of the apparatus. A plug B102 for obtaining commercial electric power from a plug receptacle is connected to the power supply B101.

The reference numeral B110 denotes a reading part for effecting the reading in the facsimile apparatus. A photoelectrical conversion element (photoelectric conversion means) B111 incorporated into the image sensor of close contact type serves to convert image information of the object to be read into an electric signal. An analogue image processing part B 112 serves to effect analogue image treatment of an analogue signal outputted from the photoelectric conversion element B111, and an A/D converter B113 serves to convert the analogue signal processed in the analogue image processing part B112 into a digital code. A digital image processing part B 114 serves to effect digital treatment of the image information digitalized in the A/D converter B113 and has a function for correcting an intermediate gradation image to a proper form. A light emitting element (illumination means) B115 is incorporated into the image sensor of close contact type together with the photoelectric conversion element and acts as a light source for illuminating the object to be read. The light emitting element B115 is electrically driven by a driver B116. A CS carriage motor B117 serves to shift the image sensor of close contact type including the photoelectric conversion element B111 and the light emitting element B115 in the flat head scanner at the reading part B110, and an original conveying motor B118 serves to convey a sheet-shaped object to be read. A motor driver B119 serves to electrically drive the CS carriage motor B117 and the original conveying motor B118, and a sensor B120 serves to detect movement of the parts in the reading part B110.

In the illustrated embodiment, a recording part B130 for effecting the recording in the facsimile apparatus is constituted by an electrophotographic laser beam printer for forming an image on a recording sheet by using a laser beam. An operating part B140 for effecting various operations includes LCD B142 as a display means, an LCD driver B143 for electrically driving the LCD B142 and a key switch B141 for input means. A communication part B150 for effecting communication of image information with respect to another facsimile apparatus and includes a MODEM B151 for modulating frequency of signals generated in the apparatus into a signal having frequency band usable in a public telephone lines and demodulating a signal sent from another facsimile apparatus and an NCU B152 for controlling connection between the facsimile apparatus and a subscriber's telephone line B153.

[Explanation of Image Sensor of Close Contact Type as Image Reading Unit Constituting Image Reading Apparatus]

Now, the image sensor 108 of close contact type as the image reading unit will be explained with reference to FIG. 6. The image sensor 108 of close contact type (also referred to as "CS" (contact sensor)) includes an LED array (illumination means) 108a for illuminating a read surface of the original, a SELFOC (registered trade mark: Nippon Sheet Glass Co., Ltd.) lens array 108b for focusing light reflected from the read surface of the original onto the sensor, and a light receiving element 108c disposed immediately below the lenses and adapted to effect photoelectric conversion of the focused reflection light, which elements 108a to 108c are arranged in a line along a main scanning direction within a frame, so that one-line of the image of the original can be read without relative movement between the original and the sensor. The direction along which the image can be read without the relative movement between the original and the sensor is referred to as a main scanning direction which corresponds to a direction perpendicular to the plane of FIG. 6. In order to read the image of the original two-dimensionally, the image sensor 108 of close contact type and the original are shifted relative to each other in a sub scanning direction parallel to the surface of the original and perpendicular to the main scanning direction while effecting the reading in the main scanning direction.

The SELFOC lens 108b of the image sensor 108 of close contact type used in the flat head scanner 130 of the facsimile apparatus according to the illustrated embodiment is of long focus type and is designed to be focused on an original resting surface of the original support glass plate 130a having a thickness of 3 mm.

[Case Where Image is Read by Scanning Effected by Shifting Image Reading Unit]

The flat head scanner 130 used when the image is read by scanning effected by shifting the image reading unit (first mode) will be explained with reference to FIGS. 3, 4, 6 and 7. The flat head scanner 130 serves to read a thick original such as a book while keeping the original stationary and includes the original support glass plate 130a on which the original B is rested. The original support glass plate 130a has a thickness of 3 mm and including an original resting area and a sheet reading area of the sheet reading portion 107.

An index plate 130f for indicating positions for resting various originals B on the original support glass plate 130a is provided on the original resting surface between the original resting area and the sheet reading area of the original support glass plate 130a. The index plate 130f has thickness of 0.5 mm and has a white surface (providing white level as a reference before the image is read) contacted with the original support glass plate 130a. A frame 130b of the flat head scanner 130 is a structure for supporting the original support glass plate 130a. A guide shaft 130c for guiding the shifting movement of the image sensor 108 of close contact type within the frame 130b is attached to the frame 130b. A CS carriage 130d for shifting the image sensor 108 of close contact type along the guide shaft 130c is attached to the guide shaft 130c via bearings 130e in such a manner that the image sensor 108 of close contact type is biased toward the original support glass plate 130a.

An original hold-down plate 102e of three-layer structure comprised of a white plastic film to be contacted with the original B and a metallic base plate with the interposition of a sponge layer having a thickness of about 5 mm is supported by the pressure plate 102 for movement in an up-and-down direction so that, when the pressure plate 102 is closed, the original hold-down plate 102e urges the original B on the original support glass plate 130a against the original support glass plate 130a.

Rotation fulcrums (referred to as "hinges" hereinafter) 102f, 102g are provided between the pressure plate 102 and the frame 130b so that the pressure plate 102 can be opened by a predetermined angle with respect to the frame 130b. After the pressure plate 102 is opened, the operator can rest the original on the original support glass plate 130a or remove the original from the original support glass plate 130a.

The image sensor 108 of close contact type is shifted along the guide shaft 130c by a drive means (not shown) in the sub scanning direction shown by the arrow A perpendicular to the main scanning direction to read the surface of the original B two-dimensionally. The image sensor 108 of close contact type is biased to a surface opposite to the original resting surface of the original support glass plate 130a so that a distance between the image sensor 108 of close contact type and the original support glass plate 130a is always kept constant when the image sensor 108 of close contact type is shifted by the drive means in the sub scanning direction. With this arrangement, a level of the focus position of the image sensor 108 of close contact type on the original support glass plate 130a is kept constant, thereby obtaining a good image without out-of-focus.

[Case Where Image is Read by Scanning Effected by Shifting Object to be Read]

The original separation/convey part 106 and the sheet reading part 107 used when the image is read by scanning effected by shifting the object to be read (second mode) will be explained with reference to FIGS. 4, 6 and 7. In the original separation/convey part 106, the originals S rested on the original stacking plate 102b are firstly sent, by auxiliary convey roller 102d and an auxiliary convey urging plate 102c, to a nip between a separation roller 106b and a separation piece 106a, where the originals are separated one by one. The separated original S is conveyed to the sheet reading part 107 by a feed roller 106e and a feed sub-roller 106f urged against the feed roller 106e. An original end detection sensor 107b is disposed in front of the sheet reading part 107 so that, by detecting tip and trail ends of the original by the detection sensor, a reading start timing and a reading finish timing are set in accordance with a length of the original S.

An original hold-down roller 107a serves to aid the conveyance of the original S effected while contacting with the original support glass plate 130a in the sheet reading part 107 and receives a rotational driving force from a drive system (not shown). The original hold-down roller 107a is rotatably supported by bearings 107c, 107d disposed on both sides of the roller. The bearings 107c, 107d are contacted with the original support glass plate 130a, and a distance l between a rotation center of each bearing and the surface of the original support glass plate 130a is selected to become greater than a radius r of the original hold-down roller 107a. Thus, in the condition that the bearings 107c, 107d are contacted with the original support glass plate 130a, the original holddown roller 107a is not contacted with the original support glass plate 130a. In the illustrated embodiment, a gap δ (=I–r) between an outer peripheral surface of the original hold-down roller 107a and the original support glass plate 130a is selected to 0.2 mm.

The original passed through the sheet reading part 107 is discharged onto the original discharge tray 109 by original discharge rollers 106g, 106h.

When the original S is read, the image sensor 108 of close contact type is previously positioned below the original hold-down roller 107a, and, in a condition that the image sensor 108 of close contact type is kept stationary with respect to the flat head scanner 130, the image of the original S is read while conveying the original. To this end, an original conveying speed $V_1$ provided by the feed roller 106e and the feed sub-roller 106f is synchronous with a reading speed of the image sensor 108 of close contact type.

In this case, by selecting an original conveying speed $V_0$ provided by the original discharge rollers 106g, 106h to become slightly larger than the original conveying speed $V_1$, a weal tension force is applied between the feed roller 106e and the original discharge roller 106g, thereby preventing the slack of the original S in the sheet reading part 107. Further, the original hold-down roller 107a protruded toward the original convey path from a tangential line connecting between a periphery of the feed roller 106e and a periphery of the original discharge roller 106g has an urging force sufficient to prevent the bearing of the original hold-down roller 107a from floating from the original support glass plate 130a by a pulling force acting on the original S.

Thus, when a thickness t of the original S is smaller than the gap δ between the outer peripheral surface of the original hold-down roller 107a and the original support glass plate 130a, since the gap δ is constant and the original S is conveyed while contacting with the rotating original hold-down roller 107a, the reading is effected in a condition that the read surface of the original is spaced apart from the original resting surface of the original support glass plate 130a by a distance of (δ–t).

Since the original separation/convey part 106 is provided within the pressure plate 102, when the pressure plate 102 is opened with respect to the flat head scanner 130, the original separation/convey part 106 is also opened together with the pressure plate 102, with the result that the original convey path can easily be opened for sheet jam treatment.

Sliders 102a are provided on the original stacking portion 102b on both lateral sides of the original for sliding movement in a direction (width-wise direction of the original S) perpendicular to the conveying direction of the original S, so that lateral edges of the originals stacked on the original stacking portion 102b can be aligned with each other. Although not shown, an original detection sensor (detection means) is provided on the original stacking portion 102b to electrically determine whether the original S is set at a position where the original can be conveyed by the auxiliary convey roller 102d and the auxiliary convey urging plate 102c.

[Explanation of Changing (Switching) Operation of Light Amount of Illumination Means and Image Information Reading Operation Which are Characteristics of Image Reading Apparatus According to Illustrated Embodiment]

Now, an operation for changing (switching) the light amount of the illumination means and the reading operation will be explained with reference to FIGS. 6 and 8. Incidentally, in the illustrated embodiment, the illumination means is constituted by an LED, and the light amount is changed by changing load voltage applied to the LED.

First of all, when the reading operation is started in a step F00, the image sensor (CS) 108 of close contact type is shifted to the white reference position corresponding to the rear surface of the index plate 130f provided on the original support glass plate 130a in a step F01, and, in a step F02, by turning ON the LED in the image sensor (CS) 108 of close contact type with predetermined voltage $V_b$, the white reference is illuminated. In a step F03, the white reference level is set on the basis of an output from the image sensor (CS) 108 of close contact type corresponding to reflection light from the White-reference.

Then, in a step F04, the original detection sensor provided in the original separation/convey part 106 judges whether the original S is set on the original stacking portion 102b. If it is judged that the original S is set, the program goes to a step F20, where the scanning is effected by shifting the object to be read; whereas, if it is judged that the original S is not set, the program goes to a step F10, where the scanning is effected by shifting the image reading unit.

When it is judged that the original S is set, first of all, in the step F20, the image sensor (CS) 108 of close contact type is shifted to the sheet reading position of the sheet reading part 107. Then, when the conveyance of the original S is started in a step F21, the originals S are separated one by one in the original separation/convey part 106 and the separated original is conveyed toward the sheet reading part 107. In a step F22, the LED of the image sensor (CS) 108 of close contact type is turned ON with voltage of $V_s$. In a step F23, the original S conveyed to the sheet reading position is read by the image sensor (CS) 108 of close contact type line by line until it is judged that the reading of the original S is finished in a step F24. Then, in a step F25, similar to the step F04, the original detection sensor provided in the original separation/convey part 106 judges whether the original S exists on the original stacking portion 102b or not. If it is judged that the original S exists, the program is returned to the step F21, from where the steps F21 to F24 are repeated by times corresponding to the remaining number of originals S. In this way, a plurality of originals Scan be read continuously. In the step F25, if it is judged that the original does not exist on the original stacking portion 102b, the program goes to a step F26, where, after the last original S is discharged, the original conveying operation is stopped, and the reading operation is finished in a step F27.

In the step F04, if it is judged that the original S is not set, first of all, in the step F10, the image sensor (CS) 108 of close contact type is shifted to the original (B) reading start position. In a step F11, the LED of the image sensor (CS) 108 of close contact type is turned ON with voltage of $V_b$, and, in a step F12, the shifting movement of the image sensor (CS) 108 of close contact type along the guide shaft 130c is started. In a step F13, the original B is read by the image sensor (CS) 108 of close contact type line by line until it is judged that the reading of the original B is finished in a step F14. In the step F14, when it is judged that the reading of the original B is finished, the program goes to a step F15, where the shifting movement of the image sensor (CS) 108 of close contact type is stopped, and the reading operation is finished in a step F16.

In this way, when the relative distance between the image reading unit and the object to be read is changed in accordance with the scanning systems, by changing the light amount of the illumination means properly, the luminance of the object to be read becomes uniform, thereby permitting the recording with optimum density.

That is to say, according to the illustrated embodiment, in the case where the scanning is effected by shifting the object to be read (first mode), since the relative distance between the image reading unit and the object to be read is greater than the case where the scanning is effected by shifting the image reading unit (second mode), by setting the load voltage applied to the LED in the first mode to become greater than that in the second mode ($V_s > V_b$) to increase the alight amount of the LED, the luminance of the object to be read can be uniform in both the first mode and the second mode, thereby permitting the recording with optimum density.

[Explanation of Recording Part]

Now, the recording part 104 will be explained with reference to FIG. 4. The recording part 4 is disposed at a lower portion of the facsimile apparatus. In the recording part 104, sheets P from a sheet supply cassette 112a containing normal fixed-form size sheets are separated one by one by means of a sheet supply roller 112b, and then skew-feed of the separated sheet P is corrected by a pair of regist rollers 124, and then the sheet P is supplied to the image forming part 111 in synchronous with a control signal from the control part 120. In the image forming part 111, first of all, a surface of a photosensitive drum (electrostatic latent image bearing member) 111a is uniformly charged by a charge member 111b, and then the surface of the drum is scanned by the laser scanner 110, thereby exposing the drum in response to the image information. As a result, an electrostatic latent image is formed. When toner (developer) is adhered to the electrostatic latent image by means of a developing sleeve (developer bearing member) 111c, a toner image is formed on the photosensitive drum 111a. By conveying the sheet P while pinching the sheet between a transfer roller 111f and the photosensitive drum 111a on which the toner image was formed, the toner image is transferred onto a surface of the sheet P contacted with the photosensitive drum 111a. Then, the sheet is sent to the fixing part 116, where the sheet is conveyed while the toner image is being fixed to the sheet P by applying heat and pressure to the sheet by means of a fixing roller 116b and a pressure roller 116a. The sheet P to which the toner image was fixed is discharged onto the recording sheet discharge tray 113 by the pair of discharge rollers 117.

On the other hand, the sheets P stacked on the manual insertion sheet supply part 125 are separated one by one by a sheet supply roller 125a and an opposed separation pad 125b, and skew-feed of the separated sheet is corrected by the pair of regist rollers 124. Thereafter, similar to the sheet supplied from the cassette sheet supply part 112, the toner image is transferred onto the image forming part 111, and then the toner image is fixed to the sheet in the fixing part 116, and then the sheet is discharged onto the recording sheet discharge tray 113.

Next, a second embodiment of the present invention will be explained.

Figure 12:
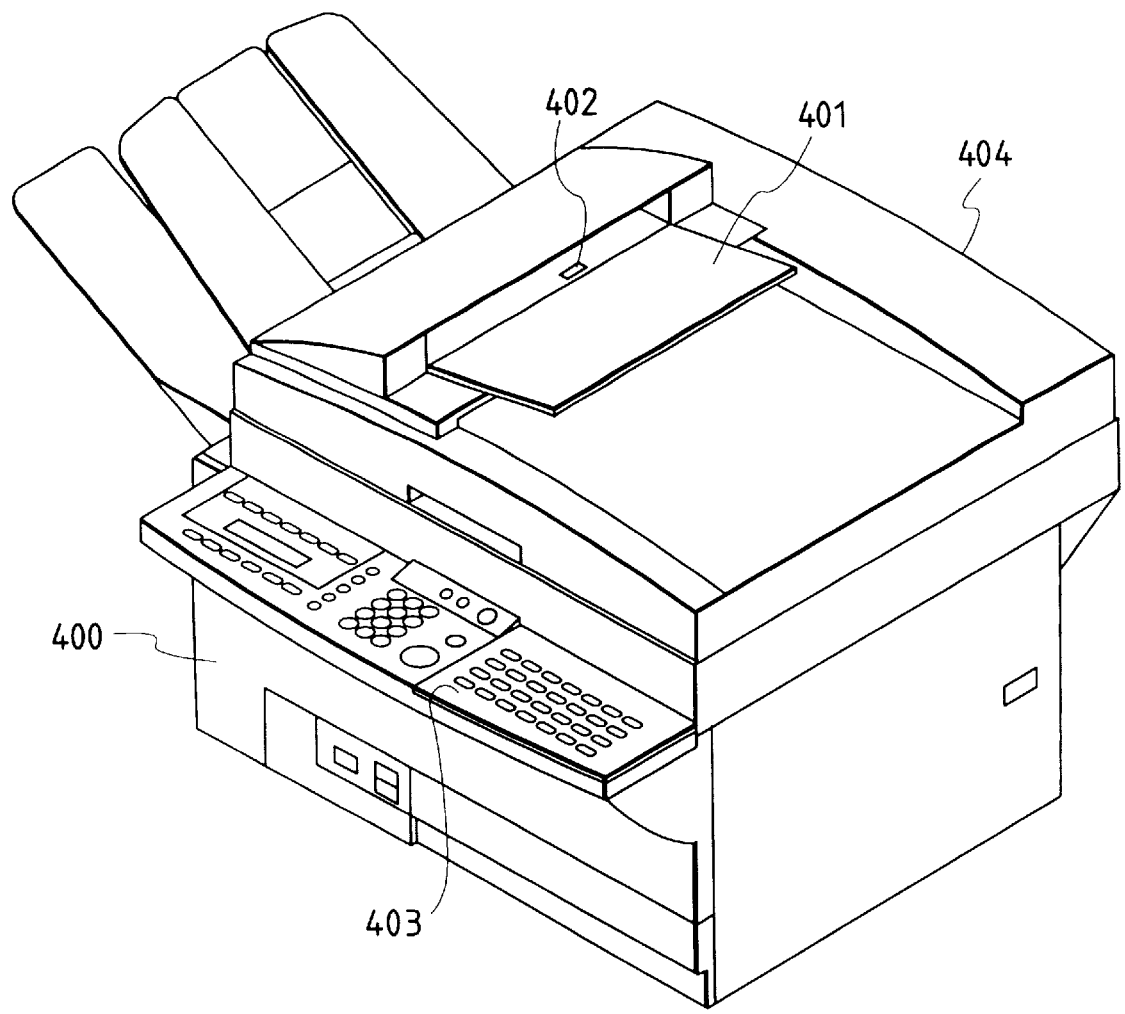
FIG. 12 is a perspective view of the reading apparatus according to the second and third embodiments.

First of all, an appearance of a reading apparatus (facsimile) according to a second embodiment of the present invention will be described with reference to FIGS. 12 and 13. In FIG. 12, the reading apparatus comprises an apparatus body 400 having an operation part 403 including a start button and the like, and an original stacking unit 404 pivotally mounted on an upper part of the apparatus body 400. At an upper part of the original stacking unit 404, there are disposed an automatic original (document) feeder (ADF) 401 for automatically feeding an original from an original stack, and an original stack sensor 402 for detecting the presence of the original stack. Further, in FIG. 5, an original stacking portion 501 on which the originals are stacked is provided on the upper surface of the apparatus body 400, and a pressure plate 502 is provided on a lower surface of the original stacking unit 404. Since the other mechanisms do not relate to the second embodiment, explanation thereof will be omitted.

Figure 10:
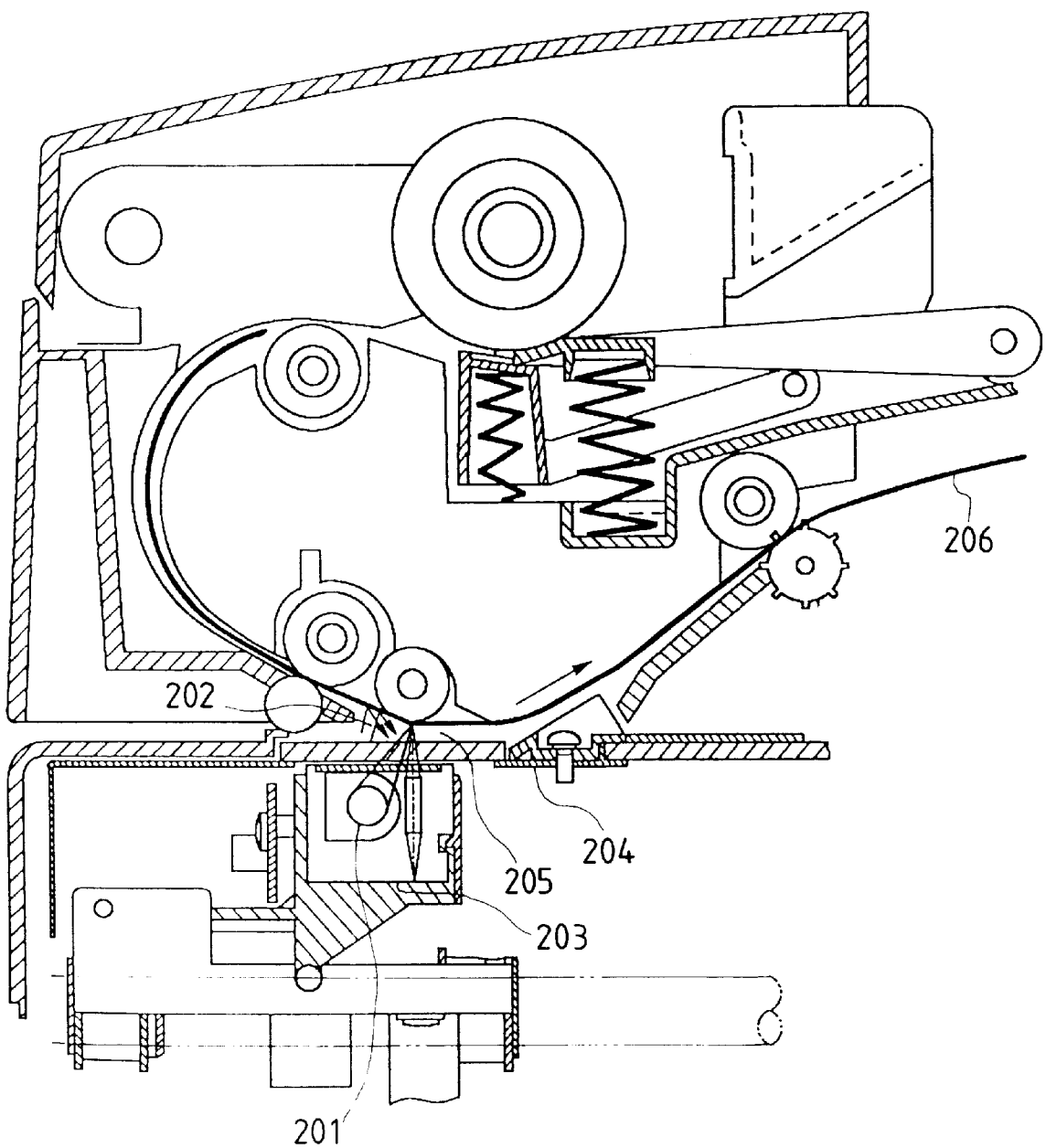
FIG. 10 is a sectional view showing an internal structure of the reading apparatus according to the second and third embodiments.
Figure 11:
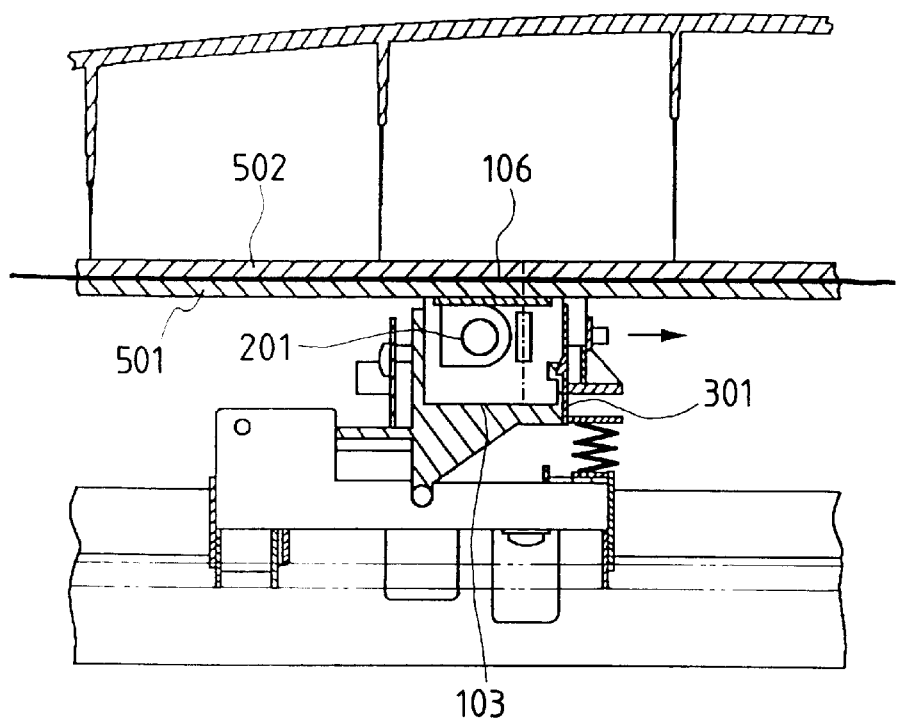
FIG. 11 is a sectional view showing an internal structure of a main part of the reading apparatus according to the second and third embodiments.

Next, an internal construction of the reading apparatus according to the second embodiment will be described with reference to FIGS. 10 and 11. In FIG. 10, within the apparatus body of the reading apparatus, there are disposed a light source 201 for emitting light, a light receiving element 203 for receiving the light emitted from the light source 201, white reference 204, and an original reading position 205. The reference numeral 202 denotes diffused reflection light and stray light; and 206 denotes the original. Further, in FIG. 11, an image sensor 301 (refer to FIG. 9) is disposed at a side of the light source 201, and the original stacking portion 501 (on which the originals are stacked) and the pressure plate 502 are disposed above the light source 201. Since the other mechanisms do not relate to the second embodiment, explanation thereof will be omitted.

Figure 14:
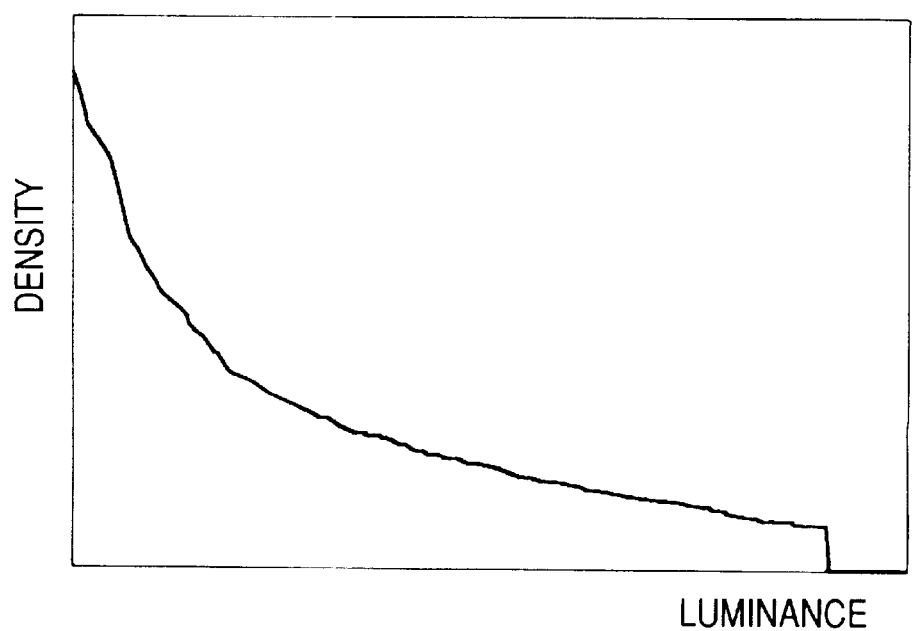
FIG. 14 is a graph showing a relation between normal illuminance and density.

FIG. 14 is a graph showing a relation between a luminance value and a density value. FIG. 15 is an explanatory view showing contents of an illuminance/density conversion table (refer to FIG. 9) determining a corresponding relation between the luminance value and the density value in the reading apparatus according to the second embodiment.

Now, an electrical arrangement of the reading apparatus according to the second embodiment will be explained with reference to FIG. 9. The reading apparatus includes an image sensor 301, a luminance correcting part 302, a luminance/density converting part 303, a luminance/density converting table (RAM) 304, a ROM 305, a digitize processing part 306, a transmitting part 307, a record output part 308, a recording device 309, an image memory 310, and a pixel density converting part 311.

The image sensor 301 serves to read a number of divided line portions of the original from a tip end to a trail end thereof. The luminance correcting part 302 is of LSI type in which output voltage of the image sensor 301 is A/D-converted and the luminance value one line white reference is stored in a memory of the luminance correcting part 302. The luminance/density converting part 303 serves to converts the obtained luminance value into a corresponding density value while referring to the luminance/density converting table shown in FIG. 15. The corresponding relation between the luminance value and the density value is stored in the luminance/density converting table (RAM) 304. A plurality kinds of luminance/density converting tables are stored in the ROM 305.

The digitize processing part 306 serves to effect multi value→digital value treatment regarding the density value converted by the luminance/density converting part 303. Conversion from the multi value to digital value will be described later. The transmitting part 307 serves to transmit a digitalized image data to external equipment. The record output part 308 serves to supply the digitalized image data to the recording device 309. The recording device 309 serves to record the image data. Various image data are stored in the image memory 310. The pixel density converting part 311 serves to effect pixel density conversion on the basis of the density value converted by the luminance/density converting part 303.

Next, an operation of the reading apparatus (facsimile) according to the second embodiment having the above-mentioned construction will be explained with reference to FIGS. 9 to 15.

After the originals are stacked on the ADF 401 or on the original stacking portion 501 of the reading apparatus (facsimile) and the pressure plate 502 is closed, when the start button of the operation part 403 is depressed, the reading operation is started. When the original reading is started, first of all, the light source 201 is turned ON to effect shading correction (correction of color unevenness of input image), and light reflected from the white reference 204 is incident on the light receiving element 203.

In this case, since minute light receiving elements are aligned with each other in a line within the light receiving element 203, a single thin line can be read. When one like receiving element is regarded as one pixel, voltage corresponding to intensity of the reflection light is outputted for each pixel.

The luminance correcting part 302 A/D-converts the output voltage, and the luminance value of the one-line white reference is stored in the memory of he luminance correcting part 302. The original stack sensor 402 provided on the ADF 401 judges whether the original should be read from the ADF 401 or from the original stacking portion 501. When the original is read from the ADF 401, after the image sensor 301 is shifted to a position where the reading position 105 can be read by the image sensor, the number of divided line portions of the original from the tip end to the trail end thereof are read while conveying the original. On the other hand, when the original is read from the original stacking portion 501, the number of divided line portions of the original from the tip end to the trail end thereof are read while shifting the image sensor 301.

The luminance value of one-line read by the image sensor 301 is standardized by the luminance value of the white reference 204 at the corresponding pixel position and the number of process gradations (for example, 64 gradations) is calculated, thereby determining the luminance of the pixel. Normally, the luminance value and the density value have a relation shown in FIG. 14, where the abscissa indicates luminance and the ordinate indicates density. Regarding the same original, when the original is read from the ADF 401, the luminance becomes greater in comparison with the case where the original is read from the original stacking portion 501. Accordingly, if the luminance/density conversion is effected on the basis of the identical luminance/density conversion table, the density values converted will be changed, even regarding the same original.

In the treatment according to the second embodiment described herein below, when the original is read from the ADF 401, the luminance/density conversion table having the greater density values (outputted regarding the luminance values) in comparison with the case where the original is read from the original stacking portion 501 is written in the RAM 304 from the ROM 305 in which the plurality of luminance/density conversion tables are stored, so that substantially the same density can be obtained both when the original is read from the ADF 401 and when the original is read from the original stacking portion 501, so long as the same original is used.

After the required correction treatment are performed, the obtained luminance value is converted into the corresponding density value by the luminance/density converting part 303 while referring to the luminance/density conversion table for determining the corresponding relation between the luminance values and the density values shown in FIG. 15. For example, in case where the luminance value is 2, when the original is read from the ADF 401, the density value is converted into 24, and when the original is read from the original stacking portion 501, the density value is converted into 22.

Further, conversion from the multi value to digital value is effected regarding the density value converted by the luminance/density converting part 303.

In this case, although there are various conversion method from multi value to digital value, in an error dispersing method, regarding the density value of a pixel in question, a middle value of the gradations (for example, if there are 64 gradations, a value of 31) is used as a threshold value, and, it is judged as "black" if the density value is greater than the threshold value and it is judged as "white" if the density value is smaller than the threshold value. In this case, the difference in density between the density value of the pixel in question and the density value (density 63) of black or the density value (density 0) of black is regarded as an error, and the digitize processing is effected while distributing the error to surrounding pixels at a predetermined rate. Thereafter, the digital (two-value) data obtained by the digitize processing part 306 is used as the image data in the transmitting part 307 and the record output part 308.

As mentioned above, according to the second embodiment, since the reading apparatus includes the ROM 305 for storing the plurality of kinds of luminance/density conversion tables for determining the relation between the luminance values and the density values, the original stack sensor 402 for determining whether the original is read from the ADF 401 or from the original stacking portion 501, and the luminance/density converting part 303 for effecting the luminance/density conversion by using the luminance/density conversion table having the greater density values (outputted regarding the luminance values) in comparison with the case where the original is read from the original stacking portion 501 when the original is read from the ADF 401, the output image density during the copying operation can be controlled to be uniform even when the original is read from the ADF 401 and when the original is read from the original stacking portion 501.

[Third Embodiment]

Figure 13:
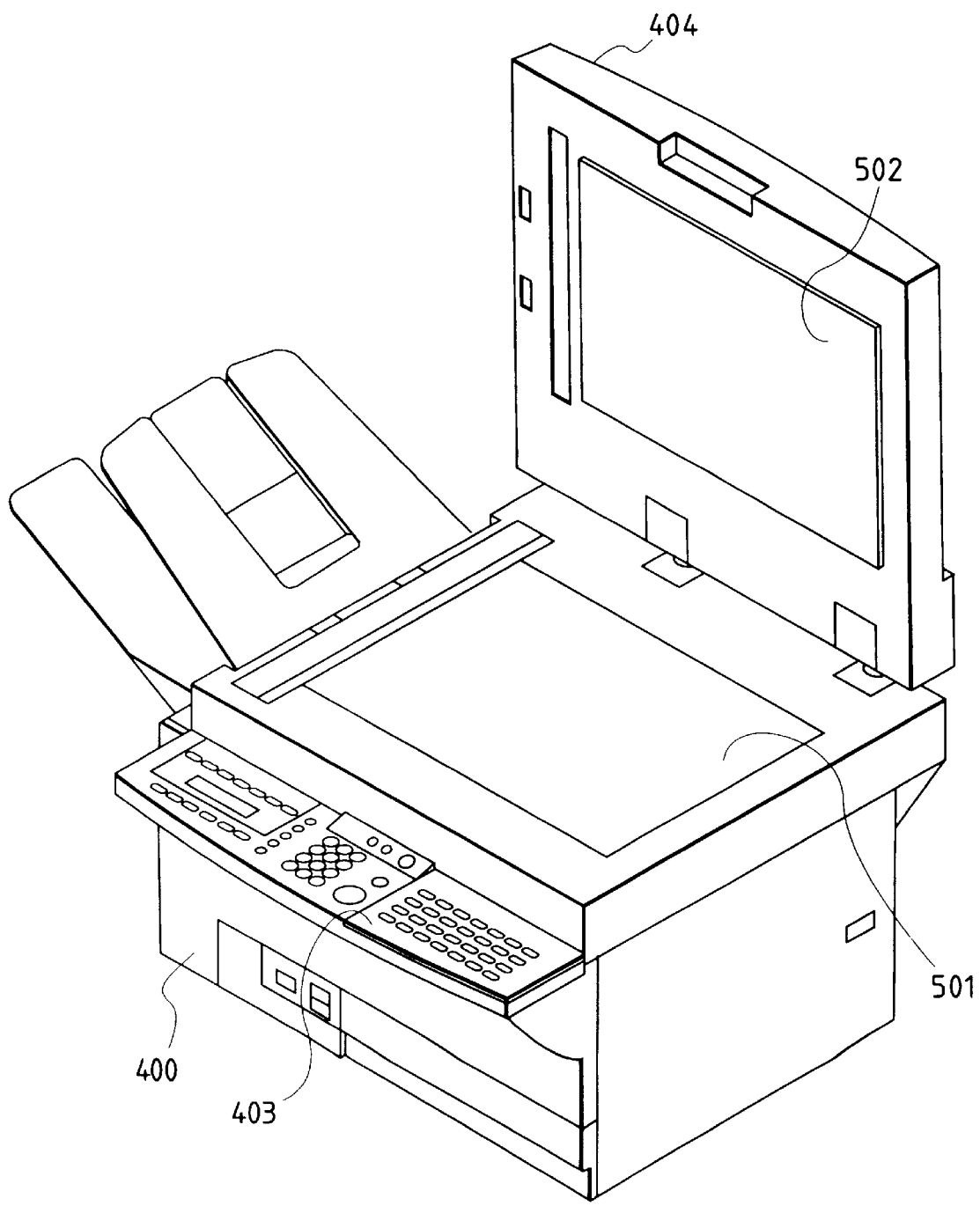
FIG. 13 is a perspective view of the reading apparatus according to the second and third embodiments in a condition that a pressure plate is opened.

Similar to the second embodiment, a reading apparatus according to a third embodiment of the present invention comprises an apparatus body 400 having an operation part 403 including a start button, a sheet number button and the like, an original stacking portion 501, an automatic original (document) feeder (ADF) 401, an original stack sensor 402, and a pressure plate 502 (refer to FIGS. 12 and 13). Further, similar to the second embodiment, within the apparatus body 400 of the reading apparatus according to a third embodiment, there are disposed a light source 201, a light receiving element 203, white reference 204, an original reading position 205, and an image sensor 301 (refer to FIGS. 10 and 11).

Figure 9:
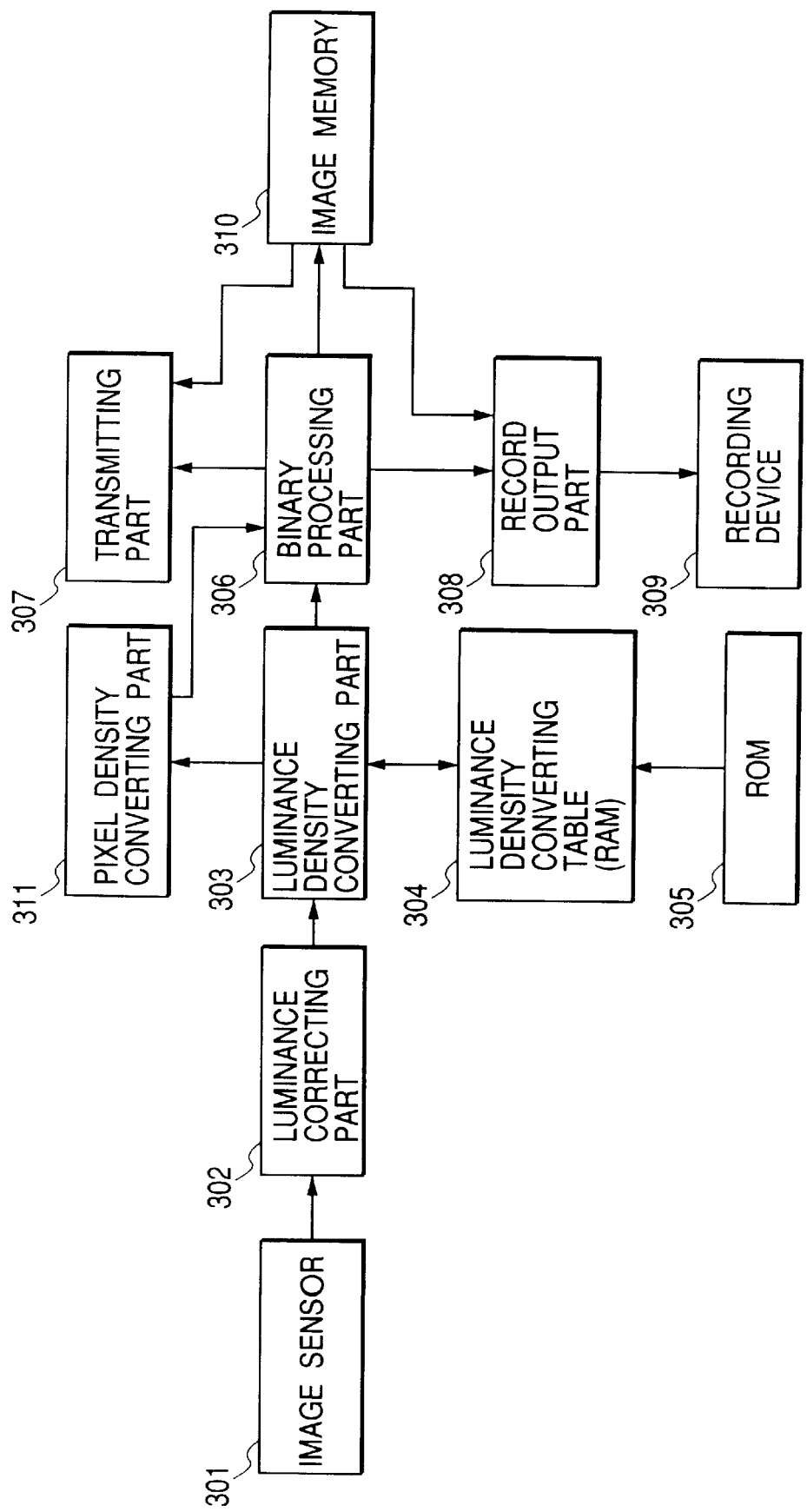
FIG. 9 is an electric block diagram of a reading apparatus according to second and third embodiments of the present invention.

Further, similar to the second embodiment, the reading apparatus according to a third embodiment includes the image sensor 301, a luminance correcting part 302, a luminance/density converting part 303, a luminance/density converting table (RAM) 304, a ROM 305, a digitize processing part 306, a transmitting part 307, a record output part 308, a recording device 309, an image memory 310, and a pixel density converting part 311 (refer to FIG. 9).

Next, an operation of the reading apparatus (facsimile) according to the third embodiment having the above-mentioned construction will be explained with reference to FIGS. 9 to 13.

For example, when a single original is read by using the ADF 401 and a plurality of copies are obtained, since the same original cannot be read by plural times, if the image memory is few, after the read luminance value is converted by the pixel density converting part 311 with low resolving power, the luminance value is converted into the density, and the digitized image data is stored in the image memory 310 and is outputted to the recording device 309 which was switched to low resolving power.

High resolving power output luminance/density converting tables and low resolving power output luminance/density converting tables for the reading from the ADF 401 and the reading from the original stacking portion 501 are stored in the ROM 305.

When the single original is read by using the ADF 401 and a plurality of copies are obtained or when the single original is read by using the ADF 401 and a single copy is obtained, after the originals are stacked on the ADF 401 of the reading apparatus (facsimile), by depressing the copy number button and the start button (in case of plural copies) or by depressing the start button (in case of single copy), the reading operation is started. When the original reading is started, first of all, the light source 201 is turned ON to effect shading correction (correction of color unevenness of input image), and light reflected from the white reference 204 is incident on the light receiving element 203.

In this case, since minute light receiving elements are aligned with each other in a line within the light receiving element 203, a single thin line can be read. When the light receiving element is regarded as one pixel, voltage corresponding to intensity of the reflection light is outputted for each pixel.

The luminance correcting part 302 A/D-converts the output voltage, and the luminance value of the one-line white reference is stored in the memory of the luminance correcting part 302. When the original is read from the ADF 401, after the image sensor 301 is shifted to a position where the reading position 105 can be read by the image sensor, the number of divided line portions of the original from the tip end to the trail end thereof are read while conveying the original. The luminance value of one-line read by the image sensor 301 is standardized by the luminance value of the white reference 204 at the corresponding pixel position and the number of process gradations (for example, 64 gradations) is calculated, thereby determining the luminance of the pixel.

As mentioned above, for example, when the single original is read by using the ADF 401 and the plurality of copies are obtained, since the same original cannot be read by plural times, if the image memory is few, by converting the read luminance value with low resolving power by means of the pixel density converting part 311, consumption of the memory is reduced. On the other hand, as mentioned above, when the single is read by using the ADF 401 and the single copy is obtained, since it is not required that the image data is stored in the image memory 310, the image data with high resolving power is outputted without effecting the pixel density conversion. In dependence upon the fact that the image is outputted with low resolving power or high resolving power, since the diameter of the output dot is changed, gradient is also changed. Thus, even when the digital data multi-value/two-value-converted from the same density value is outputted, output density is varied.

In the treatment according to the third embodiment described herein below, when the data is outputted with low resolving power, the low resolving power output luminance/density conversion table is written in the RAM 304 from the ROM 305, so that substantially the same density can be obtained both when the data is outputted with low resolving power and when the data is outputted with high resolving power.

After the required correction treatment are performed, the obtained luminance value is converted into the corresponding density value by the luminance/density converting part 303 while referring to the luminance/density conversion table written in the RAM 304. Further, conversion from the multi value to binary value is effected by the binary processing part 306 regarding the density value converted by the luminance/density converting part 303.

When the image data is not stored in the image memory 310, the digital image data obtained by the digitize processing part 306 is transferred to the record output part 308. Thereafter, the data is outputted from the record output part 308 to the recording device 309. Further, the digital image data can be transmitted to the transmitting part 307. On the other hand, when the image data is stored in the image memory 310, after the digital image data obtained in the digitize processing part 306 is stored in the image memory 310, the digital image data is transferred from the image memory 310 to the record output part 308 by plural times. Thereafter, the data is outputted from the record output part 308 to the recording device 309. Further, the digital image data can be transmitted to the transmitting part 307 by plural times.

As mentioned above, according to the third embodiment, since the reading apparatus includes the ROM 305 storing the plurality of kinds of luminance/density conversion tables for determining the relation between the luminance values and the density values, the recording device 309 capable of changing the output resolving power of the image, and the luminance/density converting part 303 for effecting the luminance/density conversion in accordance with the output resolving power when the image is recorded by the recording device 309, i.e., for effecting the luminance/density conversion by using the low resolving power output luminance/density conversion table when the data is outputted with low resolving power and by using the high resolving power output luminance/density conversion table when the data is outputted with high resolving power, the output image density during the copying operation can be controlled to be uniform even when the data is outputted with low resolving power and when the data is outputted with high resolving power.

Incidentally, the present invention may be applied to a system comprised of a plurality of equipments or to an apparatus comprised of a single equipment. Of course, it should be noted that a memory medium storing a program code of software for performing the operations of the above-mentioned embodiments is supplied to the system or the apparatus, and a computer (or CPU or MPU) of the system or the apparatus reads out the program code stored in the memory medium and carries out the program code.

In this case, the program code itself read out from the memory medium achieves the functions of the above-mentioned embodiments, and the memory medium storing such program code constitutes a part of the present invention.

The memory medium storing the program code may be, for example, a floppy disc, a hard disc, an optical disc, a photo-magnetic disc, a CD-ROM, a CD-R, a magnetic tape, a non-volatile memory card or a ROM.

Further, by performing the program code read out by the computer, not only the functions of the above-mentioned embodiments can be achieved, but also a part of entire of the actual treatments can be carried out by an OS activating on the computer to achieve the functions of the above-mentioned embodiments.

Further, after the program code itself read out from the memory medium is written in a memory of a function extension board inserted into the computer or a function extension unit connected to the computer, a part of entire of the actual treatments can be carried out by a CPU of the function extension board or the function extension unit to achieve the functions of the above-mentioned embodiments.

The present invention is not limited to the above-mentioned embodiments, but various alterations and modifications can be made within the scope of the invention.

What is claimed is:

1. An image scanning apparatus comprising:
   an original resting surface on which an original is rested;
   a scanning unit adapted to move relative to the original while irradiating light on the original;
   a light receiving portion adapted to receive a reflected light from the original; and
   original convey means for conveying the original in respect to said original resting surface,
   wherein the original is scanned by at least one of a first mode in which an original image is scanned by moving said scanning unit with respect to the original in a stationary state, and a second mode in which the original image is scanned by moving the original by said original convey means with respect to said scanning unit in the stationary state, and
   wherein the amount of light irradiated by said scanning unit on the original is greater in the second mode than in the first mode.

2. An image scanning apparatus according to claim 1, further comprising:
   an original convey member provided at a stationary position of said scanning unit in the second mode and opposed to said original resting surface with a gap therebetween.

3. An image scanning apparatus according to claim 1, wherein said light receiving portion includes a light receiving element for outputting image data.

4. An image scanning apparatus according to claim 3, wherein the irradiating light amount is greater in the second mode than in the first mode, when light to be reflected from the original for outputting the image data to said light receiving element is formed.

5. An image scanning apparatus according to claim 4, wherein said light receiving element is integrated with said scanning unit.

6. An image scanning apparatus according to claim 1, wherein said scanning unit includes a light source.

7. An image scanning apparatus according to claim 6, wherein said light source is a light emitting diode.

8. An image scanning apparatus according to claim 6, wherein a loaded voltage to the light source in the second mode is greater than a loaded voltage to the light source in the first mode.

9. An image scanning apparatus according to claim 1, wherein said image scanning apparatus is used for an image forming apparatus.

10. An image scanning apparatus according to claim 1, wherein the light amount which is greater in the second mode than in the first mode, is an intensity of light with which the original is irradiated for image pickup.

\* \* \* \* \*

UNITED STATES PATENT AND TRADEMARK OFFICE
CERTIFICATE OF CORRECTION

PATENT NO. : 6,359,705 B2
DATED : March 19, 2002
INVENTOR(S) : Masahiro Funakoshi et al.

It is certified that error appears in the above-identified patent and that said Letters Patent is hereby corrected as shown below:

<u>Title page,</u>
Item [54], "READING" should read -- SCANNING --.

<u>Column 1,</u>
Line 1, "READING" should read -- SCANNING --.

<u>Column 2,</u>
Line 64, "is" should be deleted.

<u>Column 4,</u>
Line 26, "121" should read -- 121 denotes --.

<u>Column 5,</u>
Line 19, "trade mark:" should read -- trademark: --.

<u>Column 9,</u>
Line 22, "synchronous" should read -- synchronism --.

<u>Column 10,</u>
Line 49, "plurability" should read -- plurability of --; and
Line 56, "a" should be deleted.

<u>Column 12,</u>
Line 3, close up right margin;
Line 4, close up left margin; and
Line 4, "method" should read -- methods --.

UNITED STATES PATENT AND TRADEMARK OFFICE
CERTIFICATE OF CORRECTION

PATENT NO.   : 6,359,705 B2
DATED        : March 19, 2002
INVENTOR(S)  : Masahiro Funakoshi et al.

It is certified that error appears in the above-identified patent and that said Letters Patent is hereby corrected as shown below:

Column 14,
Line 42, "equipments" should read -- pieces of equipment --;
Line 43, "a" should read -- the --;
Line 43, "a single equipment" should read -- a single piece of equipment --; and
Line 60, "entire" should read -- the entirety --.

Column 15,
Line 1, "entire" should read -- the entirety --.

Signed and Sealed this

Sixteenth Day of July, 2002

*Attest:*

*Attesting Officer*

JAMES E. ROGAN
*Director of the United States Patent and Trademark Office*